A. A. ARNOLD.
OPHTHALMIC MOUNTING.
APPLICATION FILED NOV. 24, 1917.
1,321,077.
Patented Nov. 11, 1919.
2 SHEETS—SHEET 1.
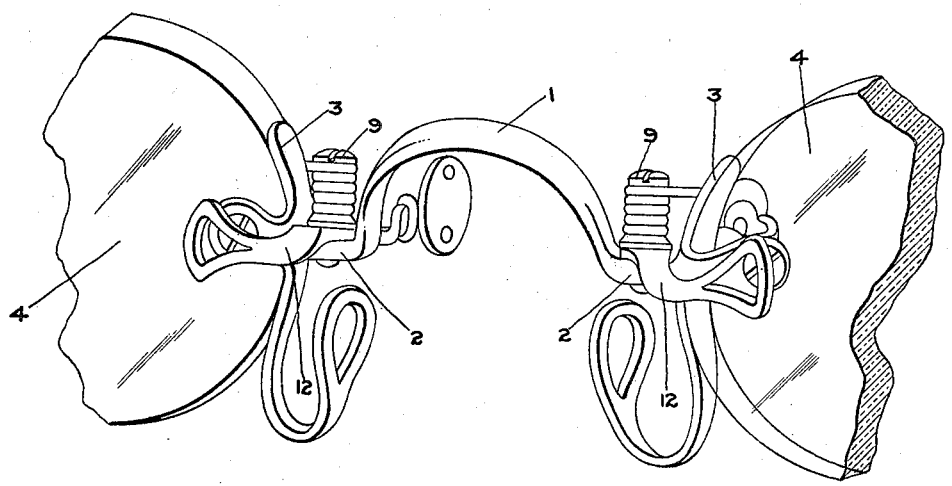
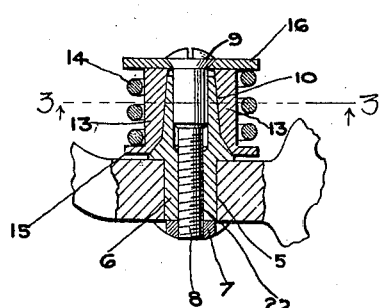
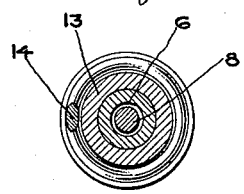
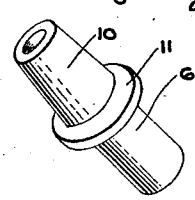
Inventor
A. A. Arnold
By H. H. Styll & H. K. Parsons
Attorneys

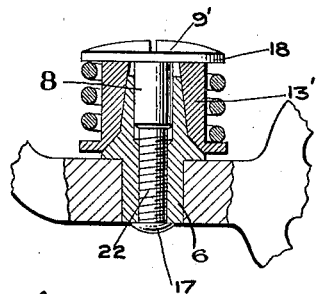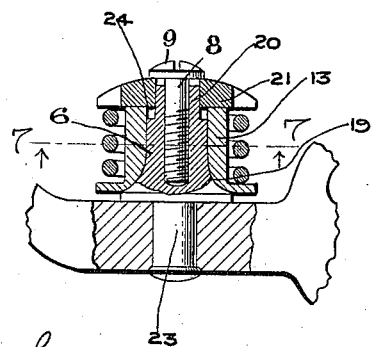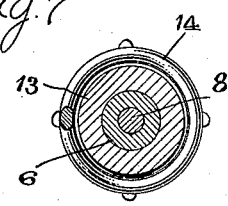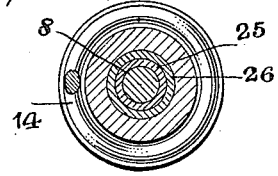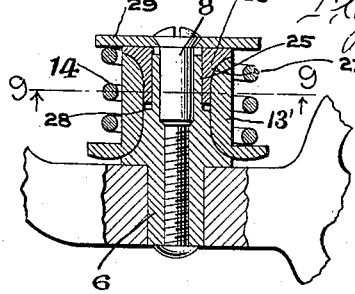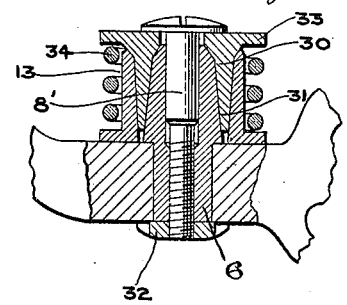

UNITED STATES PATENT OFFICE.

ARTHUR A. ARNOLD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,321,077.     Specification of Letters Patent.     Patented Nov. 11, 1919.

Application filed November 24, 1917. Serial No. 203,781.

*To all whom it may concern:*

Be it known that I, ARTHUR A. ARNOLD, a citizen of the United States, residing at Southbridge, in the county of Worcester and State of Massachusetts, have invented certain new and useful Improvements in Ophthalmic Mountings, of which the following is a specification.

This invention relates to new and useful improvements in ophthalmic mountings and more particularly to a fingerpiece mounting, wherein the guards are carried by pivoted spring actuated levers, which may preferably be manually operated to facilitate application or removal of the mounting from the face.

The leading object of this invention is the provision of a new construction of bearing or pivot for the fingerpieces which will be known as a tractrix pivot-bearing that will eliminate the objectionable wear usually occurring at the point of pivoting and thus prevent undesirable wabbling or early breakage of the parts of the mounting.

A further object of the present invention is the provision of an improved construction of this purpose in which the several parts shall be so formed as to be capable of ready assemblance and so related to each other as to facilitate to a minimum the assembling of the several parts of the mounting in a neat and efficient manner.

A still further object of this invention is the provision of a tractrix bearing provided with means whereby the several parts can be readily adjusted to account for the slight wear due to the constant use of the fingerpieces.

With the above and other objects in view the invention consists in the novel features of construction and the combination and arrangement of parts hereinafter more fully set forth, pointed out in the claims and shown in the accompanying drawings, in which Figure 1 is a perspective view of a pair of eyeglasses constructed in accordance with my invention.

Fig. 2 is a vertical sectional view, of the fingerpiece mounting.

Fig. 3 is a transverse sectional view.

Fig. 4 is a detail perspective view of the pivot post.

Fig. 5 is a vertical sectional view of another form of my invention.

Fig. 6 is a similar view of another form of the invention.

Fig. 7 is a sectional view taken on the line 7—7 of Fig. 6.

Fig. 8 is a vertical sectional view of still another form of the invention.

Fig. 9 is a transverse sectional view on the line 9—9 of Fig. 8, and

Fig. 10 is a vertical sectional view of another form of the invention.

In the construction of my improved pivot or bearing it will be understood that the several parts thereof are so constructed and assembled that there will be a uniform wear over the several contacting surfaces so as to prevent these parts from becoming loose and having a tendency to become wabbly and inducing early breakage such as usually occurs with the forms in use at the present time. Furthermore it will be understood that whatever uniform wearing occurs can be readily taken up through the medium of suitable adjusting means provided for this purpose.

In the drawings accompanying this application I have illustrated in Fig. 1 a pair of eyeglasses which include in their construction a nose bridge 1 provided with the usual bridge seats 2 having the straps 3 at their outer ends which are suitably secured to the lenses 4. The bridge seats 2 are each provided with a suitable opening 5 for the lower end of the bearing post 6, which is securely retained in position within the opening 5 by means of the nut 7 threaded on the lower end of the securing pin 8 that extends through the bearing post and is provided upon its upper end with a head 9, slotted to provide for ready turning movement of the pin. It will be readily apparent that the bearing post will be securely held against longitudinal movement by having the nut 7 bearing against the lower face of the bridge rest.

It will be noted that the upper end of the bearing post 6 is tapered upon its outer surface as shown at 10 and formed at the intermediate portion of the post at the lower end of the tapering portion is an annular flange 11 the lower face of which bears against the upper face of the bridge seat to limit the downward movement of the bearing post in the opening 5 and also to retain the same in an upright position. In mounting the fingerpiece 12 upon the bearing post a sleeve 13 is provided intermediate the ends of the fingerpiece, the inner wall of which is tapered to correspond with the taper on the bearing post whereby the sleeve will readily fit thereon for turning movement. The lower portion of the inner wall is tapered outwardly and adapted to bear upon the outwardly tapered upper face of the flange 11 to provide for an even turning movement, but as illustrated the tapering portion of the flange terminates at a point adjacent the upper face of the bridge seat to prevent the sleeve 13 from contacting therewith.

Mounted upon a sleeve 13 upon the outside thereof is a coil spring 14 having one end engaging the lens straps and the other end engaging the fingerpiece to normally retain the same under tension. In order to retain this spring 14 in place upon the bridge seat 2 an annular flange 15 is formed on the lower end of the sleeve 13 and a washer 16 is mounted upon the upper end of the pin 8 and extends out in line with the flange 15 whereby any movement on the part of the spring is prevented. From this construction it will be readily apparent that I have provided a suitable bearing or pivot for finger pieces which is assembled for uniform wearing of the several parts and at the same time any wear can be readily taken up to prevent the parts from becoming loosened. It will also be apparent that the fingerpiece can be readily removed from the bridge seat by the removal of the nut 7 on the lower end of the pin 8. From the showing in Fig. 2 it will be apparent that the upper end of the bearing post 6 terminates at a point adjacent the head of the pin 8 so that the sleeve 13 will bear directly on the tapered portions of the post 6. From the above taken in connection with the accompanying drawings it will be readily apparent that I have provided a form of tractrix bearing wherein the several parts are disposed in such relation that it will provide for a uniform wear.

In Fig. 5 I have illustrated another form of the invention wherein the pin 8 is headed over its lower end as shown at 7, thus to do away with the nut 7 which is used in connection with the pin 8 as illustrated in that form shown in Fig. 2, and at the same time to hold the pin 8 firmly in place. The post 6 in this form of the invention is securely held in place by having the same fitting tightly within the opening in the bridge seat and forced within the opening when placed in position. The upper end of the pin is provided with a head 9′ having formed thereon an annular flange 18 which projects out over the upper end of the sleeve 13′ to securely retain the same in place upon its bearing seat. It will be noted that the only difference in this form over the main form shown in Fig. 2 is in the form of retaining pin which is used.

In Fig. 6 I have illustrated still another form of the invention wherein the bearing post is provided with a tapering curved bearing surface as shown at 19 and the interior of the sleeve 13 is provided with a similar tapering curve to correspond therewith. Furthermore in this form of the invention the bearing post 6 is provided at its upper end with a tubular extension 20 and mounted upon the upper end of this extension is a washer 21 which bears against the upper end of the sleeve 13 to securely retain the same in place upon its bearing. In the various forms of my invention illustrated in Figs. 2 and 5 the retaining pin 8 is threaded into the lower portion of the bearing post as shown at 22 and extends on through to the lower end where the nut 7 may be attached to the pin or the same headed over as shown at 17, while in Fig. 6 the pin 8 extends into the bearing post at a point adjacent the center thus leaving the lower end of the post of solid construction as shown at 23. The flange of the head 9 on the upper end of the pin bears upon the upper face of the washer 21, the upper end of the tubular extension terminating short of the head of the pin as shown at 24 to provide for the take up of any wear on the bearing.

In Fig. 8 I have illustrated what will be known as a double tractrix bearing, and the construction thereof is similar to the forms heretofore described with the exception of the bearing portion wherein the post 6 is formed at its end with a reduced tubular extension 25 while the lower portion of the post is provided with the tapering curved outer surface as in the form shown in Fig. 6. Mounted upon the tubular extension 25 is a supplemental sleeve 26 the outer surface of which is provided with a tapering curved surface as shown at 27 which is arranged in opposed relation to the lower portion of the bearing post thus forming a spool wherein the outer surface is provided with a tapering curve at each end, which extends from the center thereof out toward the ends in opposite directions.

The sleeve 13′ which is mounted upon the bearing shown in Fig. 8 is provided upon its inner face with a curve of substantially arcuate form as shown at 28 whereby the same will fit onto the bearing post for rotation. A suitable washer 29 is mounted upon the upper end of the pin 8 to retain the supplemental sleeve 26 in position upon the tubular extension 25. It will be noted that a suitable space is provided for between the lower portion of the post 6 and the supplemental sleeve 26, and between the tubular extension and the washer 29 to provide for a take up of the wear on the several parts of the bearing. The post in this form of the invention is securely held in place in the same manner as that illustrated in Fig. 5; that is, by fitting the post tightly within the opening in the bridge seat and having the same forced within the opening when placed in position.

In Fig. 10 I have illustrated still another form of the invention wherein the exterior of the pivot post 6 is provided with a tapering surface extending from the bridge seat to its outer end as clearly illustrated in Fig. 10. Mounted upon the pivot post 6 is a sleeve or collar 30 the walls of which are tapering or wedge shape as shown at 31 whereby it will fit tightly over the pivot post 6 and at the same time provide for a tapering bearing surface for the fingerpiece sleeve 13 arranged upon the exterior of the sleeve 30 and adapted for rotation thereon. The sleeve 30 is securely held in place upon the post 6 by means of the screw bolt 8' which threads through the lower end of the pivot post and is provided with a removable nut 32 to securely hold the bolt 8' against removal. The sleeve 30 is provided with an annular flange 33 which extends laterally to retain the coil spring 34 in place upon the fingerpiece sleeve 13. From this it will be apparent that I have provided a new and improved bearing for fingerpieces that will eliminate the objectionable wear usually occurring at the point of pivoting and thus prevent undesirable wabbling or early breakage of the parts of the mounting. In this last form of the invention it will be noted that any slight wear can be readily taken up by adjusting the screw bolt 8' and forcing the tapering walls 31 of the sleeve 30 down between the walls of the sleeve 13 and the pivot post 6 thus imparting a spreading of these two sleeves.

It will be apparent from the foregoing that I have provided a tractrix bearing for fingerpieces wherein the sleeve to which the fingerpiece is attached is mounted upon a tapering surface which provides for a uniform wear. The several parts of my invention are so constructed that they can be readily assembled or taken apart and at the same time are so fitted together as to provide for a uniform wear on all of the several parts of the bearing.

I claim:

1. The combination with a bridge seat, having an opening, of a pivot post having a straight portion extending into the opening, a tapering portion on the post above the bridge seat, means for securing said post in the opening and a spring actuated fingerpiece mounted on the tapering portion of the post.

2. The combination with a bridge seat, having an opening, of a pivot post mounted within said opening, a flange on the post bearing on the bridge seat, a tapered portion on the post above the flange, a sleeve mounted for rotation on the post and a spring actuated fingerpiece carried by the sleeve.

3. The combination with a bridge seat, having an opening, of a pivot post mounted within said opening, a securing pin carried by the post, a sleeve mounted on the post, a spring actuated fingerpiece carried by the sleeve, and means on the head of the pin for retaining the sleeve upon the post.

4. A device of the class described including a pivot post, having a tapering outer portion at one end thereof, a sleeve having its inner walls tapered to fit the tapered portion of the post and a spring actuated fingerpiece carried by the sleeve, 5. A device of the class described including a pivot post, having a tapered bearing surface, a sleeve having tapered inner walls to correspond with the bearing surface, a securing pin carried by the post, means carried by the pin for retaining the sleeve on the post, and a spring actuated fingerpiece carried by the sleeve.

6. A device of the class described including a pivot post, having a tapered bearing surface, a wedge shape collar mounted upon the post, a sleeve inclosing the body portion of the collar, a flange at the outer end of the collar and a pin carried by the post and engaging the outer end of the collar to retain the same in place.

7. A device of the class described including a pivot post, having a tapered bearing surface, a flange at the inner end of the bearing surface, a sleeve mounted on the post and resting on the flange, a securing pin carried by the post, means carried by the pin for retaining the sleeve on the post and a spring actuated fingerpiece carried by the sleeve.

8. A device of the class described including a pivot post, having a tapered bearing surface, a sleeve around the post, a collar having wedge shape walls adapted to be disposed between the sleeve and post, a flange on the collar extending over the sleeve to retain the same in place upon the post and a retaining pin carried by the post for engagement with the collar to hold the same in place.

In testimony whereof I have affixed my signature, in presence of two witnesses.

ARTHUR A. ARNOLD.

Witnesses:
H. E. COLEMAN,
S. S. CANN.